United States Patent [19]

Watanabe et al.

[11] 4,336,216
[45] Jun. 22, 1982

[54] PROCESS FOR PRODUCING SILICON CARBIDE HEATING ELEMENTS

[75] Inventors: Masakazu Watanabe; Akiyasu Okuno; Yasushi Matsuo, all of Nagoya, Japan

[73] Assignee: NGK Spark Plug Co., Ltd., Aichi, Japan

[21] Appl. No.: 157,738

[22] Filed: Jun. 9, 1980

[30] Foreign Application Priority Data

Jun. 8, 1979 [JP] Japan .................................. 54-72464

[51] Int. Cl.$^3$ .............................................. C04B 35/56
[52] U.S. Cl. ........................................ 264/65; 264/66; 501/90; 501/91
[58] Field of Search ....................... 106/44; 264/65, 66

[56] References Cited

U.S. PATENT DOCUMENTS 3,998,646 12/1976 Weaver .................................. 264/65
4,031,178 6/1977 Johnson ................................ 264/65

FOREIGN PATENT DOCUMENTS 50-78609 6/1975 Japan .
52-110499 9/1977 Japan .
53-121810 10/1978 Japan .

*Primary Examiner*—John A. Parrish
*Attorney, Agent, or Firm*—Sughrue, Mion, Zinn, Macpeak & Seas

[57] ABSTRACT

A process for producing silicon carbide heating elements is described comprising:
a primary sintering wherein a mixture including SiC powder, boron or a boron compound, and carbon or a carbon compound in specific proportions, is molded and sintered to obtain a sintered product having from 70 to 95% of the theoretical density; and
a secondary sintering wherein the sintered product obtained in the primary sintering is further sintered at each temperature from 1,600° C. to 2,200° C. to obtain a sintered product having a density of at least 80% of the theoretical density and a specific resistivity of not more than 1.0 Ω-cm.

7 Claims, 2 Drawing Figures

PROCESS FOR PRODUCING SILICON CARBIDE HEATING ELEMENTS

BACKGROUND OF THE INVENTION

1. Field of the Invention

This invention relates to a process for producing heating elements of silicon carbide, and more particularly to an improved process for producing silicon carbide heating elements of high strength and low resistivity.

2. Description of the Prior Art

Silicon carbide heating elements have hitherto been used as heating elements for use in electric furnaces. Recently they have also been used as heating elements for various industrial apparatuses. For these uses, high strength, low electric resistivity, a low negative temperature coefficient of resistivity, and high resistance to oxidation at high temperatures are required.

The following procedures have been developed for the sintering of silicon carbide (SiC):

(1) Japanese Patent Application (OPI) No. 78609/75 (The term "OPI" as used herein refers to a "published unexamined Japanese patent application".) filed by General Electric Co. entitled "PROCESS FOR PRODUCING A HIGH DENSITY SILICON CARBIDE BODY", describes a process in which a mixture of SiC, a boron compound and a carbon material is sintered in an argon (Ar) atmosphere at 2,050° C. for 60 minutes to obtain a sintered product having a density of 95% or more of the theoretical density. This sintered product, however, is not suitable for use as a heating element, since its specific resistivity is more than several $\Omega$-cm, and moreover its specific resistivity at high temperature is extremely reduced.

Where such a mixture is sintered in nitrogen at 2,200° C. or less, the density of the sintered product obtained is only about 80% of the theoretical density, resulting in the formation of a sintered product of low strength, even though its specific resistivity is 1.0 $\Omega$-cm or less. On the other hand, if the mixture is sintered in nitrogen atmosphere at higher temperatures, the specific resistivity is as high as $10^1$ to $10^6$ $\Omega$-cm and the stability of its specific resistivity is low, even though it is sintered up to about 90% of the theoretical density.

(2) Japanese Patent Application (OPI) No. 110499/77 filed by the Carborundum Co. discloses "FUEL IGNITER COMPRISING A NOVEL SILICON CARBIDE COMPOSITION AND PROCESS FOR PREPARING THE COMPOSITION" in which a powder containing 95% or more SiC is sintered to 2.5 g/cc by hot pressing, and N, P, As, Sb and Bi in a solid or gas phase are doped therein to provide a specific resistivity at room temperature of 0.66 $\Omega$-cm. This sintered product is also not suitable for use as a heating element of the energy-saving type, since its specific resistivity at 1,350° C. is 0.12 $\Omega$-cm, that is, its temperature coefficient of resistivity is not good.

(3) According to Japanese Patent Application (OPI) No. 121810/78, "HIGH DENSITY THERMAL SHOCK RESISTANT SINTERED SILICON CARBIDE", filed by the Carborundum Co., SiC, 0.3 to 3.0% by weight based on the weight of SiC, of an additive selected from BN, BP, AlB$_2$ and mixtures thereof, and 150 to 500% carbon based on the weight of additive, heated at from 1,900° C. to 2,500° C. to provide a sintered product having a density of 85% or more of the theoretical density. This sintered product, however, is substantially the same as the sintered product of Japanese Patent Application (OPI) No. 78609/75, which is sintered at atmospheric pressure. Moreover, even though a sintered product has a density of 95% or more of the theoretical density, it is somewhat inferior in resistance to oxidation to those to which B and B$_4$C are added.

SUMMARY OF THE INVENTION

This invention is intended to solve the problems of the prior art, as described above.

This invention, therefore, provides a process for producing silicon carbide heating elements comprising:

a primary sintering wherein a mixture including (1) SiC powder having an average particle diameter of not more than 1.0$\mu$, (2) form 0.3 to 3.0% by weight, based on the weight of the SiC powder, of boron or a corresponding amount of a boron compound, and 0.1 to 3.0% by weight, based on the weight of the SiC powder, of carbon or a corresponding amount of a carbon compound is molded and sintered in vacuum or in a non-nitrogen inert atmosphere (that is, containing no nitrogen) to obtain a sintered product having form 70 to 95% of the theoretical density; and a secondary sintering wherein the sintered product obtained in the primary sintering is further sintered in an atmosphere of nitrogen gas at a temperature from 1,600° C. to 2,200° C. to provide a silicon carbide heating element having a density of at least 80% of the theoretical density and a specific resistivity of not more than 1.0 $\Omega$-cm.

The sintered product thus-obtained is of high strength, because of its high density, and of low resistivity, and its specific resistivity at high temperatures does not show any significant decrease.

DETAILED DESCRIPTION OF THE INVENTION

Figure 1:
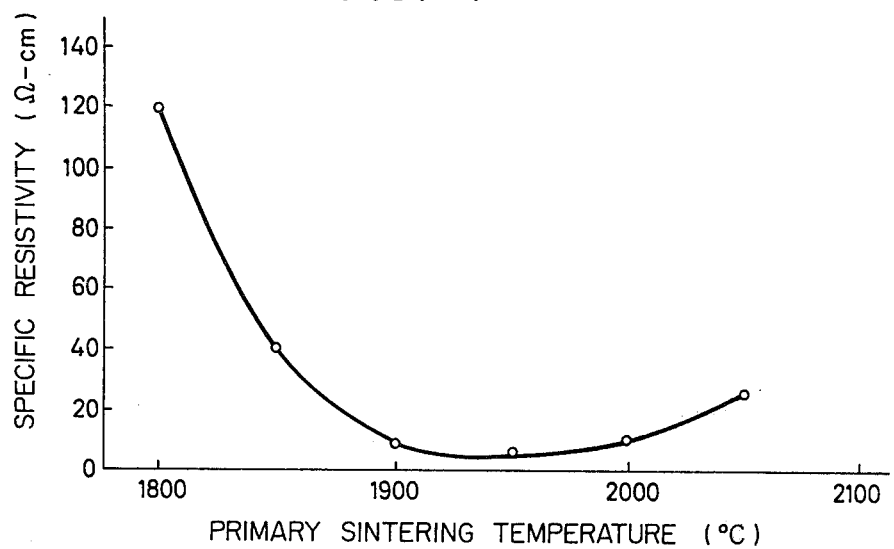
FIG. 1 illustrates the dependence of the specific resistivity on the sintering temperature in the primary sintering.

In accordance with the process of this invention, the sintering is divided into two steps, viz., a primary sintering carried out in a vacuum or in a non-nitrogen inert atmosphere, and a secondary sintering carried out in an atmosphere of nitrogen gas. The reason for this is that if the sintering is carried out in an atmosphere of nitrogen gas from the beginning of the sintering, the density of the sintered product obtained is less than 80% of the theoretical density even though its specific resistivity falls within the desired range, and therefore the fracture strength does not reach the necessary value.

The density obtained by the primary sintering should be controlled within the range of from 70 to 95% of the theoretical density. If the density is below 70%, even if the secondary sintering is applied, the final density does not reach 80% of the theoretical density, which should be required for the ultimate product. On the other hand, if the density is more than 95%, closed pore are formed in the sintered product and pores passing through to the center portion cannot be obtained, as a result of which the action of nitrogen during the secondary sintering does not reach the center portion of the element.

The particle diameter of SiC used as a starting material should be not more than 1.0μ. Where it is more than 1.0μ, sintered products having the required density cannot be obtained. Another reason for which SiC having such particle diameters is employed is to permit the sufficient doping of nitrogen by increasing the specific surface of the sintered product obtained by the primary sintering.

Elementary boron or boron carbide is preferably used as a boron source, which improves the sintering properties of the SiC. The amount of boron should be within the range of 0.3 to 3.0%, based on the weight of the SiC powder. In amounts less than 0.3%, the improvement in the sintering properties is insignificantly small, whereas in amounts more than 3.0%, the boron or boron compound accelerates the grain growth of the SiC, and deteriorates the sintering properties of the SiC, and furthermore, since the boron or boron compound is an electrically positive doping agent, the electric characteristics are not thereby improved. Preferred examples of the boron source are $AlB_2$, $BN$, $BP$ or $SiB_6$ in addition to elementary boron or boron carbide.

Carbon produces the effects of improving the sintering properties, by deoxidizing an oxidized layer on the surface of SiC particles, and of controlling the grain growth. In amounts less than the lower limit of 0.1%, the above effects cannot be obtained, whereas in amounts greater than the upper limit of 3.0%, free carbon is formed, thus deteriorating the physical characteristics of the sintered product, particularly the fracture strength. The primary sintering is preferably sintered at each temperature from 1,750° C. to 2,050° C. for period from 10 to 60 minutes.

The secondary sintering in nitrogen acts to reduce the specific resistivity. In this secondary sintering, the sintering temperature should be in the range of 1,600° C. to 2,200° C. Where the sintering temperature is less than 1,600° C., the reduction of the specific resistivity due to the introduction of nitrogen atoms is low. On the other hand, where it is more than 2,200° C., scale is formed on the surface of the sintered product, because the $N_2$ and SiC react with volatilization of the SiC, and the specific resistivity increases to $10^1$ to $10^6$ $\Omega$-cm.

The density of the ultimate silicon carbide heating element should be 80% or more of the theoretical density, because where it is less than 80%, the fracture strength is too low. The specific resistivity should be not more than 1.0 $\Omega$-cm, because elements having a specific resistivity of more than 1.0 $\Omega$-cm cannot be designed as heating elements of the energy-saving type. The secondary sintering is preferably sintered for period of at least 1 hour, more preferably about 3 hours.

The following example is given to illustrate this invention in greater detail.

EXAMPLE

β-SiC Powder having an average particle diameter of 0.3μ and 0.5% by weight, based on the weight of the SiC powder, of boron carbide powder were dispersed in an acetone solution with 6% by weight, based on the weight of the SiC powder, of a phenol resin dissolved therein, and was then wet-mixed, dried, sieved, pressed, and preliminarily heated in vacuum at 800° C. to prepare a mold.

At first, this mold was sintered in an argon atmosphere at atmospheric pressure at each temperature from 1,800° C. to 2,050° C. for 60 minutes to obtain a primary sintered product. The dependence of the specific resistivity on the sintering temperature in this primary sintering is illustrated in FIG. 1.

Figure 2:
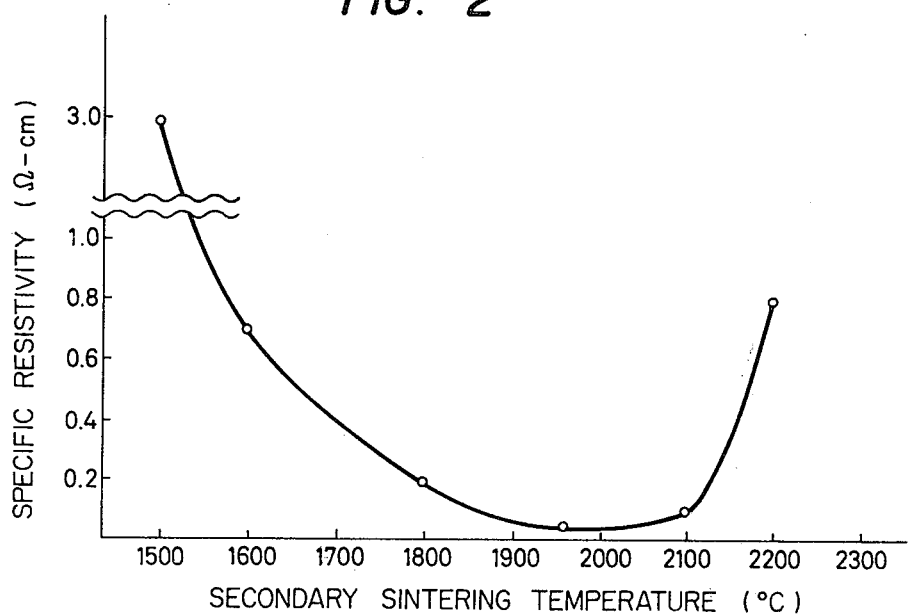
FIG. 2 illustrates the dependence of the specific resistivity on the sintering temperature where a sintered product obtained by the primary sintering at 1,950° C. is subjected to the secondary sintering in nitrogen.

The primary sintered product was then subjected to the secondary sintering wherein it was again heated in a nitrogen ($N_2$) atmosphere at 1,950° C. to obtain a secondary sintered product. The dependence of the specific resistivity on the sintering temperature in this secondary sintering is illustrated in FIG. 2. Thus the most preferred specific resistivities are obtained within the secondary sintering temperature range of 1,600° C. to 2,200° C.

The characteristics of the sintered products of this invention and a comparative sintered product not falling within the range of this invention are shown in Table 1, and the characteristics of conventional sintered products are shown in Table 2.

As can be seen from Table 1, this invention permits the production of silicon carbide heating elements having the specific resistivity of 1.0 $\Omega$-cm or less, low negative temperature coefficients, and high strength, which are of great value for commercial use. They can be used as a glow plug in internal combustion engines, other fuel igniter or the like.

TABLE 1

| Sample No. | Primary Sintered Product | | Secondary Sintered Product | | | | | |
|---|---|---|---|---|---|---|---|---|
| | Relative Density (%) | Specific Resistivity at Room Temperature ($\Omega$-cm) | Reheating Temp. (°C.) | Relative Density (%) | Specific Resistivity ($\Omega$-cm) | Ratio of Resistivity at Room Temp. to Resistivity at 1350° C. | Modulus of Rupture (kg/mm$^2$) | Remarks |
| 1 | 70 | 40.5 | 2100 | 85 | 0.06 | 1.4 | 18 | This Invention |
| 2 | 80 | 10.0 | 2100 | 87 | 0.06 | 1.3 | 28 | This Invention |
| 3 | 90 | 3.85 | 1950 | 90 | 0.06 | 1.4 | 35 | This Invention |
| 4 | 93 | 10.8 | 2000 | 93 | 0.2 | 2.1 | 40 | This Invention |
| 5 R | 98 | $10^6$ | 2000 | 98 | $10^6$ | — | 55 | Comparative Example |

TABLE 2

| Sample No. | Sintering Temp. (°C.) | Relative Density (%) | Specific Resistivity at Room Temperature (Ω-cm) | Ratio of Resistivity at Room Temperature to Resistivity at 1350° C. | Modulus of Rupture (kg/mm$^2$) | Remarks |
| --- | --- | --- | --- | --- | --- | --- |
| 6 R | 2050 | 72.5 | 0.12 | 2.4 | 10 | Japanese Patent Application No. 78609/75 |
| 7 R | 2100 | 81.3 | 0.09 | 1.8 | 15 | Japanese Patent Application No. 78609/75 |
| 8 R | 2200 | 92.2 | 10 | 30 | 30 | Japanese Patent Application No. 78609/75 |
| 9 R | 2300 | 96.3 | 10$^4$ | — | 25 | Japanese Patent Application No. 78609/75 |
| 10 R | — | 80 | 0.66 | 5.5 | — | Japanese Patent Application No. 110499/75 |

While the invention has been described in detail and with reference to specific embodiments thereof, it will be apparent to one skilled in the art that various changes and modifications can be made therein without departing form the spirit and scope thereof.

What is claimed is:

1. A process for producing a silicon carbide heating element comprising:

a primary sintering wherein a mixture including (1) beta-SiC powder having an average particle diameter of not more than 1.0μ, (2) from 0.3 to 3.0% by weight, based on the weight of the beta-SiC powder, of boron or a corresponding amount of a boron compound, and (3) from 0.1 to 3.0% by weight, based on the weight of the beta-SiC powder, of carbon or a corresponding amount of a carbon compound is molded and sintered in vacuum or in a non-nitrogen inert atmosphere to obtain a sintered product having from 70 to 95% of the theoretical density; and a secondary sintering wherein the sintered product obtained in the primary sintering is further sintered in an atmosphere of nitrogen gas at a temperature from 1,600° C. to 2,200° C. to obtain a silicon carbide heating element having a density of at least 80% of the theoretical density and a specific resistivity of not more than 1.0 Ω-cm.

2. A process for producing a silicon carbide heating element as in claim 1, wherein the boron compound is boron carbide, AlB$_2$, BN, BP and SiB$_6$.

3. A process for producing a silicon carbide heating element as in claim 1 or 2, wherein the temperature of the primary sintering is from 1,750° C. to 2,050° C.

4. A process for producing a silicon carbide heating element as in claim 1, wherein the primary sintering is conducted for a period of from 10 to 60 minutes.

5. The process of any of claims 1 through 4, inclusive, wherein the primary sintering is carried out in an argon atmosphere.

6. The process of any claims 1 through 4, inclusive, wherein the sintered product from the primary sintering has at least 90 percent of theoretical density.

7. The process of claim 5 wherein the sintered product from the primary sintering has at least 90 percent of theoretical density.

* * * * *